UNITED STATES PATENT OFFICE.

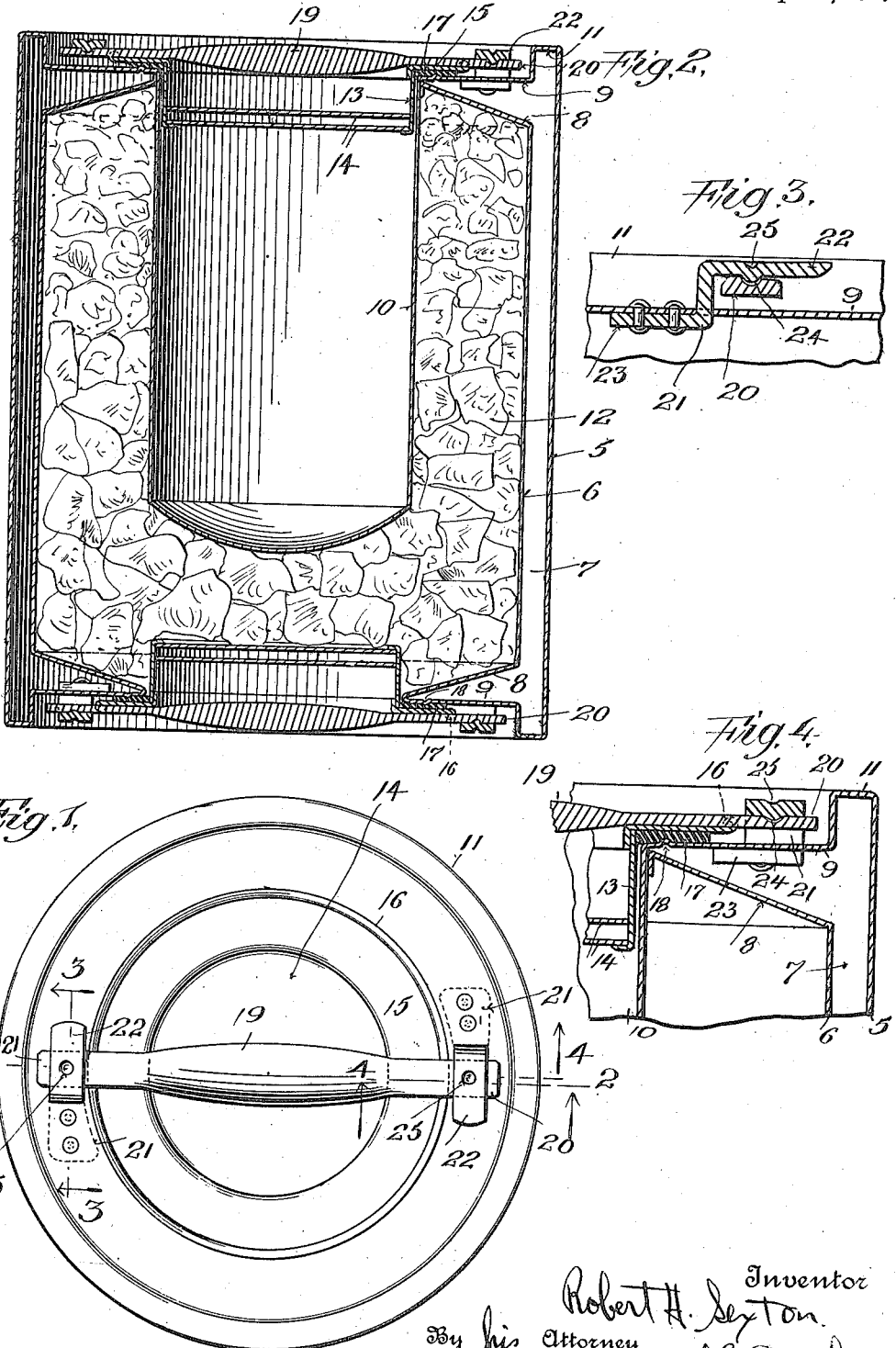

ROBERT H. SEXTON, OF NEW YORK, N. Y., ASSIGNOR TO WILLIAM A. SEXTON COMPANY, INCORPORATED, OF NEW YORK, N. Y., A CORPORATION OF NEW YORK.

FREEZER.

1,221,482.   Specification of Letters Patent.   Patented Apr. 3, 1917.

Application filed February 28, 1916. Serial No. 80,920.

*To all whom it may concern:*

Be it known that I, ROBERT H. SEXTON, a citizen of the United States, residing in the city, county, and State of New York, have made a certain new and useful Invention in Freezers, of which the following is a specification.

This invention relates to freezers and particularly to that class of devices known as ice cream freezers.

The object of the invention is to provide a freezer which is of simple structure, economical to manufacture and efficient in operation.

A further object of the invention is to provide means which are simple and efficient to detachably secure and lock the cover of the freezer receptacle in place in air tight relation to such receptacle.

A further object is to provide the receptacle cover with a simple handle arrangement by which the cover or the entire freezer may be lifted.

A further object is to provide a freezer structure which may rest upon and be opened at each end thereof.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawings:—

Figure 1 is a view in top plan view of a freezer embodying the principles of my invention.

Fig. 2 is a central longitudinal section of the same on the line 2, 2, Fig. 1, looking in the direction of the arrows.

Fig. 3 is a broken detail view on the line 3, 3, Fig. 1, looking in the direction of the arrows.

Fig. 4 is a similar view somewhat enlarged, on the line 4, 4, Fig. 1, looking in the direction of the arrows.

The same part is designated by the same reference numeral wherever it occurs throughout the several views.

My invention relates particularly to that type of freezer in which the freezing operation is accomplished without resorting to manual or other rotary movement of the receptacle containing the material to be frozen, wherein a minimum amount of freezing mixture is required, and wherein the material when frozen may be retained in frozen state.

In freezers of this type it is desirable for convenience in using, handling and shipping the same to so construct the device as to enable it to stand level on either end. It is also desirable to employ tops or covers at each end of the structure to afford access through one end to the interior of the freezer for the purpose of cleansing the same, or of supplying thereto or removing therefrom the freezing mixture, and through the other end to supply and remove the material to be frozen. It is also desirable to apply the covers in such manner as to afford air tight joints and to detachably lock the same in place. It is also desirable to provide suitable and convenient handles by which the covers when removed, or the entire freezer structure may be lifted or handled.

It is among the special purposes of my invention to provide a structure in which these desirable results are attained in an easy and simple manner.

In the drawing I have shown, as an embodiment of the principles of my invention, a freezer structure comprising an outer wall 5, and an inner wall 6, having a dead air space 7 therebetween. These walls may be of any suitable contour and material. I have found that a cylindrical structure made of suitable metal well answers the purpose. The walls 5, 6, may be joined together at their ends in any suitable or convenient manner. Preferably I provide the inner wall 6 with the outwardly inclined end portions 8 which constitute drain surfaces while the end portions 9 of the outer member 5 are depressed inwardly from the rim or edge portion 11, and form the end walls of the freezer. A central and preferably circular opening is formed through each end wall of the freezer structure. Depending into the interior chamber of the freezer structure through the opening in one end thereof is a receptacle 10 to receive the material to be frozen. This receptacle is closed at its inner end and open at its outer end, and is stationarily held as, for instance, by being incorporated into an integral or rigid structure with the walls 5, 6. The space of the interior chamber of the freezer between the inner wall 6 and the receptacle 10 is designed to be filled with a suitable freezing mixture such as cracked ice and salt, or other equivalent, as indicated at 12, which is supplied to said chamber through the opening in one of the end walls of the freezer. This opening, as well as the open end of the receptacle 10 at the other end of the freezer is designed to be closed by a cover adapted to be detachably locked thereto. As the structures and manner of mounting and detachably locking these covers are the same a description of one will answer for both. The covers each consist of a central cylindrical portion 13 which, when the cover is applied to the freezer, depends through the opening it is adapted to close, and, if desired, and as shown, is provided with a double walled inner end 14. At its outer end the cylindrical portion 13 of the cover is provided with a laterally extending circular rim portion 15, terminating, in the particular form shown, in a raised peripheral bead or rib 16. The rim portion 15 of the cover extends outwardly over the end wall portion or surface 9 of the freezer structure, and a packing ring of rubber, felt or other suitable material, indicated at 17, is interposed therebetween. When the cover is placed and locked in position the packing ring 17 is clamped between the rim 15 and the surface 9, thereby making an air tight joint. The packing ring 17 may be retained in position in any suitable manner. A simple arrangement for this purpose is shown wherein a crimp 18 is formed in the surface of the end wall 9, with which the packing ring 17 engages.

Extending across the central depressed portion of the cover is a handle 19, having its ends secured by soldering or otherwise to the top surface of the cover rim 15. Preferably, though not necessarily, the bead 16 of the rim is cut down to form seats for the ends of the handle, as shown by dotted lines in Fig. 4, the extreme end portions 20 of the handle extending beyond the edge of the rim 15. Suitably secured to the end wall 9 at diametrically opposite points are hook members 21, having oppositely presenting overhanging end portions 22, underneath which the free ends 20 of the cover handle 19, respectively engage when the cover is applied to the freezer structure and then given a slight axial rotary movement, thereby locking the cover in place. By reversing the operation the cover is detached from the freezer and may be then lifted out by means of the handle. While the hook members 21 may be secured to the freezer structure in any suitable or convenient manner, I have shown a simple arrangement wherein the said hook members are of Z-shape, the ends 22, constituting overhanging hooks underneath which the ends of the handle 19 engage to lock the cover to the freezer, as above explained, while the other ends 23 pass through openings in the end wall 9 of the freezer structure and are secured to the inner surface thereof as clearly shown in Fig. 3. This affords a strong rigid structure to enable the entire freezer structure to be lifted and handled by means of the handle 19 when the cover is applied and locked thereto with the lifting strain taken by said hook members. If desired, and in order to insure an air tight joint for the cover when applied and locked, the under surface of the overhanging portions 22 of the hook members may be slightly inclined to the plane of the upper surface of the handle ends 20, by tapering the same, or otherwise whereby an increasing downward pressure is exerted upon the handle ends as they pass underneath said portions 22 in locking the cover to the freezer structure. This action causes the cover rim 15 to press down firmly on the packing ring 17, thereby securing the desired object of an air tight joint. If desired or required any suitable means may be employed to retain the handle ends in locked position. Simple means for this purpose are shown wherein a slightly depressed seat 24 is formed in the upper surface of each end of the handle to receive a slight projection 25 formed on the under surface of the overhanging portions of the hook members when the handle attains fully locked position.

It will be seen that the covers with their handles and locking means are received wholly within the depression in the ends of the freezer structure. That is these parts are inside the panes of the freezer structure ends, and consequently the said structure may rest or stand solidly upon either end without interference from any projecting portion of handle or cover. This is a valuable feature of my invention as thereby the handling, storing and shipping of the freezer are greatly facilitated.

Access to the interior chamber of the freezer is gained through the opening in end of the structure for the purpose of filling the same with the freezing mixture, or removing such mixture, or for cleaning the said chamber while access is had to the receptacle 10 to introduce or remove the material to be frozen or to clean the said receptacle, through the opening in the other end of the structure.

While I have shown and described a specific structure as illustrative of the principles of my invention it is to be understood that many changes and variations in the details will readily occur to persons skilled in the art and still fall within the spirit and scope of my invention.

What I claim as new and useful and of my own invention and desire to secure by Letters Patent, is—

1. In a freezer, the combination with a vessel having double walled sides, of a relatively small receptacle suspended from one end of said vessel and provided with an open mouth extending through the same, a removable cover for said mouth having its central portion depressed within the central surface of said end, an opening through the other end of said vessel to afford access to the interior thereof surrounding said suspended receptacle, and a removable cover for said second mentioned opening.

2. In a freezer, the combination with a vessel having double walled sides, of a relatively small receptacle suspended from one end of said vessel and provided with an open mouth extending through the same, a removable cover for said mouth having its central portion depressed within the central surface of said end, and provided with a bar extending across and beyond the central depressed portion to engage lugs carried by said vessel to hold said cover in place and to afford, in conjunction with said depressed portion, a space and handle for the hand to lift said vessel, an opening through the other end of said vessel to afford access to the interior thereof surrounding said suspended receptacle, and similar removable cover for said second mentioned opening.

In testimony whereof I have hereunto set my hand in the presence of the subscribing witnesses, on this 21st day of February A. D., 1916.

ROBERT H. SEXTON.

Witnesses:
    FREDERICK W. RUSSELL,
    HELEN M. BOWMAN.